United States Patent [19]

Takahashi

[11] Patent Number: 4,730,298

[45] Date of Patent: Mar. 8, 1988

[54] MOVING DEVICE FOR AN OPTICAL RECORDING SYSTEM IN A HIGH DENSITY SPIRAL TRACK-FORMING APPARATUS

[75] Inventor: Yoshihiko Takahashi, Yokohama, Japan

[73] Assignee: Kabushiki Kaisha Toshiba, Kawasaki, Japan

[21] Appl. No.: 654,232

[22] Filed: Sep. 25, 1984

[30] Foreign Application Priority Data

Sep. 27, 1983 [JP] Japan ................................ 58-176885

[51] Int. Cl.$^4$ ........................ G11B 7/00; G11B 21/08
[52] U.S. Cl. .................................. 369/111; 369/239; 369/56; 369/98; 369/44
[58] Field of Search ................. 369/44, 111, 116, 239, 369/240, 241, 275, 50, 51, 56, 55, 98, 219, 220, 211

[56] References Cited

U.S. PATENT DOCUMENTS

| | | | |
|---|---|---|---|
| 3,716,845 | 2/1973 | Chaffin, III | 369/111 X |
| 4,190,860 | 2/1980 | Somers et al. | 369/44 X |
| 4,328,506 | 5/1982 | Yoshida et al. | 369/116 X |
| 4,481,613 | 11/1984 | Yokota | 369/219 X |
| 4,519,056 | 5/1985 | Kimoto et al. | 369/56 X |
| 4,530,083 | 7/1985 | Ishihara | 369/240 X |
| 4,546,461 | 10/1985 | Isobe | 369/240 X |
| 4,615,023 | 9/1986 | Imada et al. | 369/44 X |

FOREIGN PATENT DOCUMENTS

| | | | |
|---|---|---|---|
| 2818845 | 11/1978 | Fed. Rep. of Germany | 369/239 |
| 0097160 | 6/1983 | Japan | 369/239 |
| 0137168 | 8/1983 | Japan | 369/239 |
| 56-41537 | 4/1987 | Japan | 369/240 |

OTHER PUBLICATIONS

K. Sano et al., Television Gakkaishi, vol. 37, No. 6, 1983, p. 482 to p. 485, sections 1 to 3.3 inclusive—copy and translation provided by applicant.

JP application 13818163—Yuski et al—copy and English translation provided by applicant, no date thereon.

Primary Examiner—Aristotelis M. Psitos
Attorney, Agent, or Firm—Schwartz, Jeffery, Schwaab, Mack, Blumenthal & Evans

[57] ABSTRACT

A high density spiral track forming apparatus according to the present invention includes a linear motion mechanism for moving an optical recording system in a radial direction of a disk-shaped substrate, and a length measurement machine for detecting the distance travelled by the optical recording system in the radial direction of the substrate disk. The apparatus further includes a velocity computing device for detecting the travel velocity of the optical recording system according to the detected result of the length measurement instrument, and a velocity control device which detects the difference between the travel velocity of the optical recording system which is detected by the velocity computing device and a predetermined velocity, and controls the linear motion mechanism so as to eliminate that difference.

1 Claim, 15 Drawing Figures

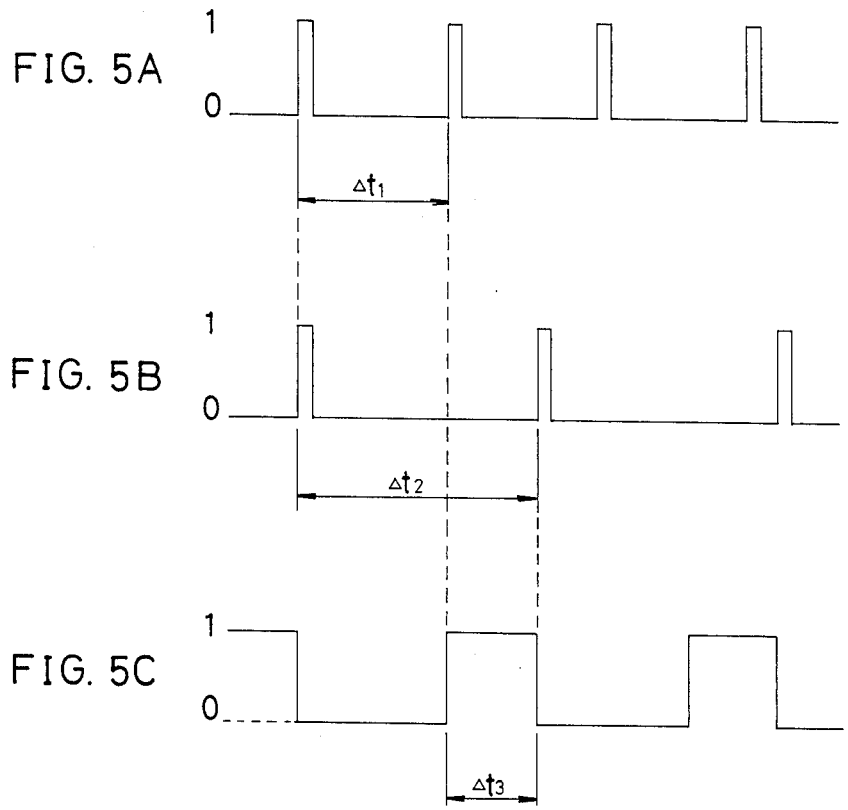
FIG. 5A
FIG. 5B
FIG. 5C
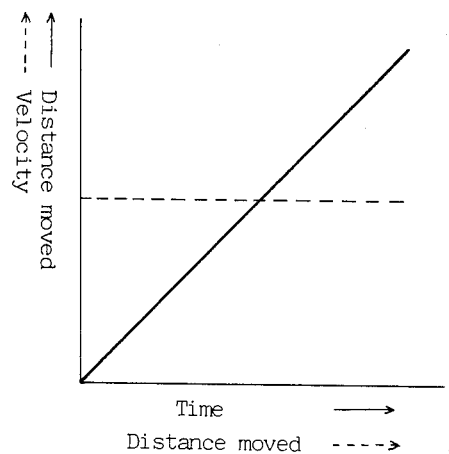
FIG. 6

MOVING DEVICE FOR AN OPTICAL RECORDING SYSTEM IN A HIGH DENSITY SPIRAL TRACK-FORMING APPARATUS

BACKGROUND OF THE INVENTION

1. Field of the Invention

The present invention relates to a spiral track-forming apparatus, for forming spiral-shaped recording tracks by feeding an optical recording system in a radial direction of a disk-shaped substance, and more particularly to a spiral track-forming apparatus which can form recording tracks of high density.

2. Description of the Prior Art

Generally, optical track-forming apparatus are known to use the method by which spiral-shaped recording tracks are formed in a photoresist coating on a disk-shaped substrate made from glass. These disks rotate at a fixed angular velocity, and an optical recording system moves in a straight line with a fixed velocity in the radial direction on the substrate disk. In the spiral track-forming apparatus described above, in order to move the optical recording system in the radial direction, a positioning control system is used. With this positioning control system, the optical recording system is moved step-wise in accordance with a pulse signal from a length measureing instrument for detecting the position of the optical recording system. For this reason, the position of the recording track on the glass substrate disk is altered in a step-wise form corresponding to the step-wise movement of the optical recording system.

In recent years, there has been a need for optical recording in a high density mode on glass substrate disk, and a means for making narrower the spacing between the recording tracks (track pitch) is usually considered. There, as a positioning control system, a system having a high resolution of positioning is required. In other words, it is necessary to have a high resolution device as a length measuring instrument for position detection for control of the positioning. However, there are limits to converting a length measuring instrument to high resolution to conform to the reduction (shrinking) of the pitch, and it is not practical. In addition, as described previously, in the case of using a positioning control system, the position of the recorded track does not change smoothly, but rather in a step-wise manner, therefore, if the track pitch is narrowed, adjacent tracks are easily caused to cross. This fact, in the case where the track pitch is narrowed and a high densification of the recording is produced, means that it is very difficult to control the radial feed of the optical recording system with the abovementioned conventional positioning control method. And if this system is executed, track pitch error is produced, and a true recording is not possible.

SUMMARY OF THE INVENTION

An object of the present invention is to provide a high density spiral track-forming apparatus which is capable of accurately recording a signal with high density.

Another object of the present invention is to provide a high density spiral track-forming apparatus which is capable of precisely compressing the pitch of the recording track.

Another object of the present invention is to provide a high density spiral track-forming apparatus which is capable of forming a smooth, non-stepwise, spiral-shaped track.

Another object of the present invention is to provide a high density spiral track-forming apparatus which is capable of avoiding track pitch error when forming the high density tracks.

Another object of the present invention is to provide a high density spiral track-forming apparatus which is capable of enlarging the control band of the radial feed of the optical recording system.

In order to achieve the above objectives by means of the present invention, an optical recording system is caused to move in a straight line in the radial direction of a disk-shaped substrate which rotates at a fixed angular velocity. The spiral track-forming apparatus for forming a spiral-shaped recording track on a glass substrate disk includes a linear electrical motor mechanism which moves the optical recording system in the radial direction of the said glass substrate disk, a length measuring instrument which measures the distance moved in the radial direction by the optical recording system on the said substrate disk, a velocity calculating means which calcultes the velocity of the optical recording system based on the measured output of the length measuring instrument, and a velocity control means which detects the difference between the calculated result and the predetermined velocity and controls the drive of the liner electrical motor to eliminate that difference.

BRIEF DESCRIPTION OF THE DRAWINGS

These and other objects, features and advantages of the present invention will become more apparent from the following description of a preferred embodiment taken in conjunction with the accompanying drawings, in which:

FIG. 5, consisting of FIGS. 4A–4C, is a time chart of the control section shown in FIG. 4;

FIG. 6 is a graph showing the change in feed velocity versus the distance moved by the optical recording system, and the change in distance moved by the optical recording system versus time;

DESRIPTION OF THE PREFERRED EMBODIMENTS

Figure 1:
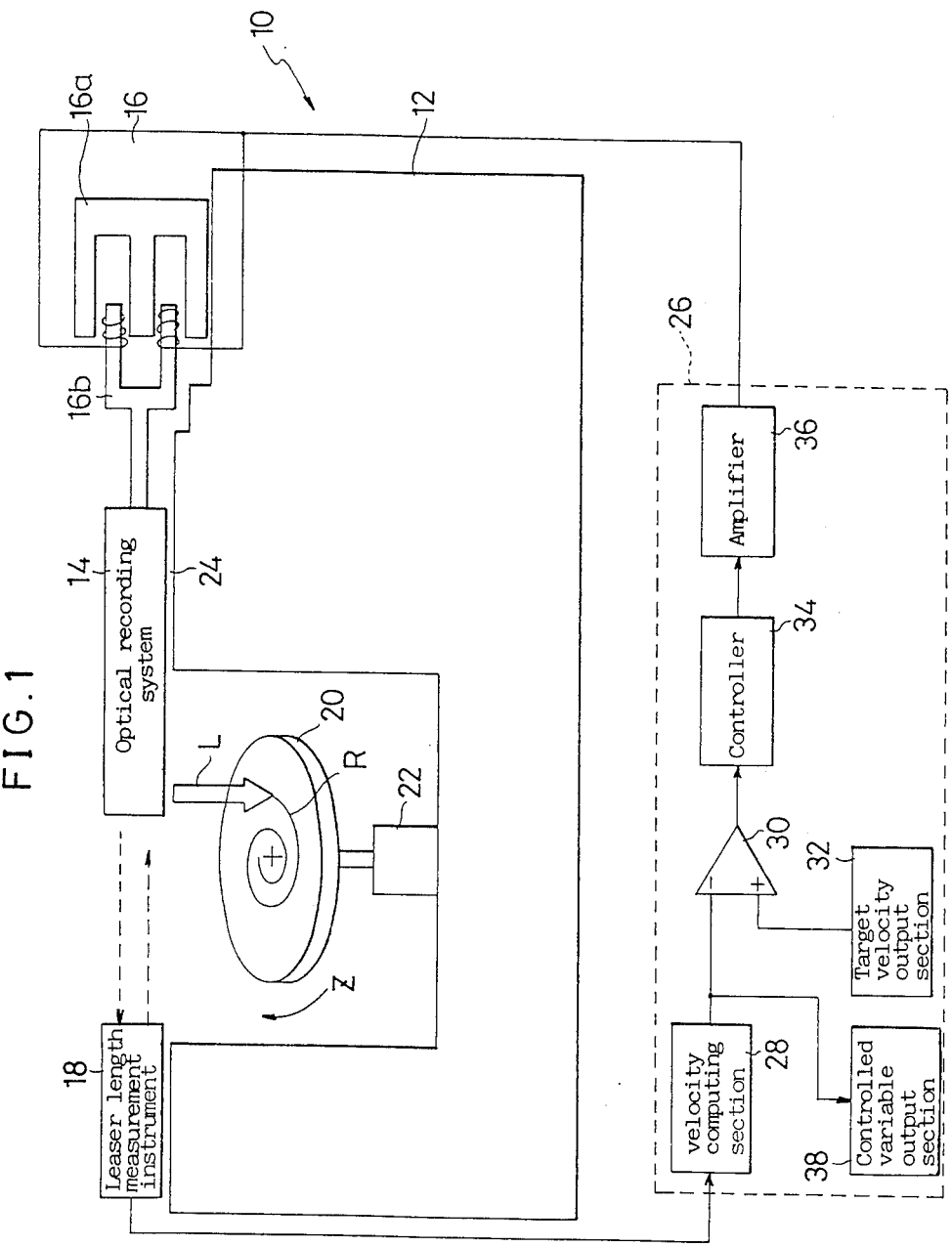
FIG. 1 is a block diagram and schematic view of a high density spiral track-forming apparatus embodying the present invention.

Referring now to FIG. 1, there is shown a high density spiral track-forming apparatus embodying the present invention identified with the reference number 10, and this spiral track-forming apparatus 10 has an antivibration base 12.

Provided on the antivibration base 12 are an optical recording system 14, a linear DC feed motor 16, a laser length measuring instrument 18, and a motor 22 which turns a disk-shaped glass substrate disk 20.

The optical recording system 14 forms a recording track R on a disk-shaped glass substrate disk 20 by means of a light beam L, and is supported, for example, in a floating non-contact manner by an air bearing 24. Thus the optical recording-system 14 can move on the surface of the disk 20 by means of the linear DC feed motor 16 in the horizontal direction in the drawing, that is, in the radial feed direction of the disk 20.

The linear DC feed motor 16 is made up of a motor body 16a, formed from a magnetic yolk with a magnetic gap, and a movable coil 16b which opposes the motor body 16a. The motor body 16a is secured to the antivibration base 12, and the movable coil 16b is linked to the optical recording system 14. In the linear DC motor 16, the motor body 16a and the movable coil 16b do not contact each other. There this motor 16 has high precision of the degree relying on the current flowing in the movable coil 16b. This current is determined by a recording control section 26, which will be described later.

The laser length measuring instrument 18 measures distance by using laser interference and, as will be later described in more detail, comprises of a laser head, an interferometer, and a reflecting mirror. In this embodiment, a reflecting mirror is attached to the optical recording system 14 for moving therewith and it becomes possible to measure the distance moved by the optical recording system 14 relative to the disk 20 by means of the laser length measuring instrument 18. The result of this length measurement is put out to the recording control section 26. The measurement resolution of the laser length measuring instrument 18 can be less than 1/100 of the wave length of the laser used.

The recording control section 26 is added to process the measured results from the laser length measuring instrument 18, and put out the control current to the movable coil 16b, for controlling the velocity at the laser length measuring instrument 18 to the preset target velocity, resulting in forming a predetermined recording track pitch. The recording control section 26 includes a velocity computing section 28, a differential amplifier 30, a target velocity output section 32, a controller 34, an amplifier 36, and a controlled variable output section 38. The velocity computing section 28 computes the velocity of the movement of the optical recording system 14 from the measured output of the laser length measurement 18. The differential amplifier 30 calculates the difference between this computed velocity and the target velocity from the target velocity output section 32, which is previously set according to the track pitch which is to be formed. According to the calculated velocity difference, a controller 34 and amplifier 36 put out the control current to the movable coil 16b so that the abovementioned velocity difference becomes zero. Therefore, the motion velocity of the optical recording system is adjusted to the target veocity. Furthermore, the controlled variable output section 38 comprises, for example, a display section of the result calculated by the velocity computing section 28.

Figure 2:
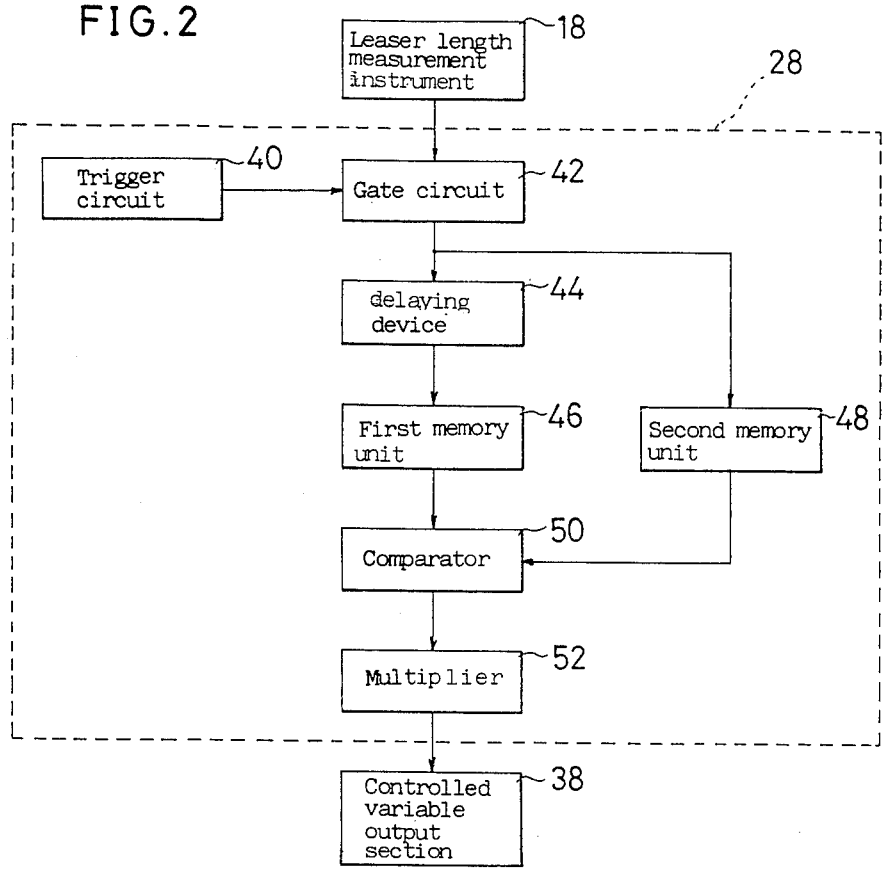
FIG. 2 is a block diagram of a velocity computing element in the control section of the spiral track-forming aparatus shown in FIG. 1.

The velocity computing section 28 is shown in detail in FIG. 2, and comprises a trigger circuit 40, a gate circuit 42, a delaying device 44, a first memory unit 46 and a second memory unit 48, a comparator 50, and a multiplier 52. The operation is as follows. The gate circuit 42 puts in a position signal from the laser length measuring instrument 18 for the optical recording system 14, in a fixed sampling cycle, of a sampling signal put out from the trigger circuit 40. The positional signal is stored in the first memory unit 46 through the delaying device 44 which retards the abovementioned sampling time. Also the positional signal is stored in the second memory unit 48. The signals from both memory units 46 and 48 are compared in the comparator 50 and the difference is calculated. This difference corresponds to the distance moved by the optical recording system 14 during one sampling period. The multiplier 52 multiplies this movement difference by a factor of 1 divided by the sampling time. In other words, by dividing this movement distance by the samling time, it calculates the moving velocity of the optical recording system 14. In this case, the precision and resolution of the calculated moving velocity is determined by the comparison of the measured resolution of the laser length measuring instrument and the sampling time. For this reason, the precision and the resolution of the calculated moving velocity may exceeds the limits of the measured resolution of the laser length measuring instrument 18 and by shortening the sampling period it can be upgraded without any limit, in principle. By this fact, the radial feed velocity of the optical recording system 14 can be controlled with high resolution and precision, and, as a result, a high precision recording track can be accurately formed.

Next, the operation of this embodiment of the present invention will be explained.

Figure 3:
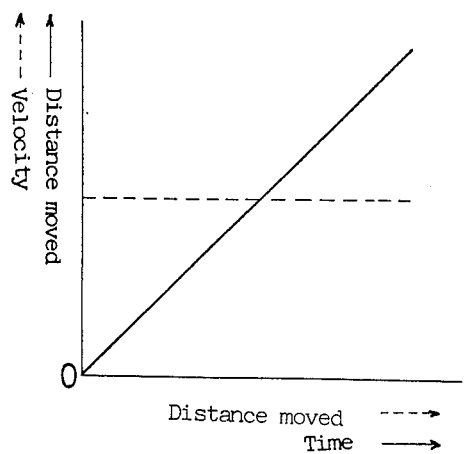
FIG. 3 is a graph showing the change in feed velocity versus the distance moved by the optical recording system, and the change in distance moved by the optical recording system versus time.

The disk 20 rotates with a fixed velocity in the direction of the arrow Z in FIG. 1, so that the feed velocity of the optical recording system 14 is determined by the size of the disk 20 and the pitch of the track which is to be formed. The recording control section 26 puts out a control current to the moving coil 16b for providing that feed velocity to initiate the radial feed of the optical recording system 14. At the same time, the recording control section 26, at a predetermined sampling period, put in the detected result provided by the laser length measuring instrument 18 according the distance which the optical recording system 14 moves. Based on this distance moved, the moving velocity of the optical recording system 14 is calculated with high resolution, and the difference between this calculated velocity and the predetermined feed velocity is calculated. The recording control section 26 then adjusts the control current sent to the moving coil 16b so that this velocity difference becomes zero. Accordingly, the radial feed velocity of the optical recording system 14 is controlled so as to always equivalent to the fixed predetermined velocity. By using this type of velocity control system, the velocity change relative to the distance moved by the optical recording system 14 is constant, similar to the broken line shown in FIG. 3, making it possible to create a smooth recording track.

Figure 4:
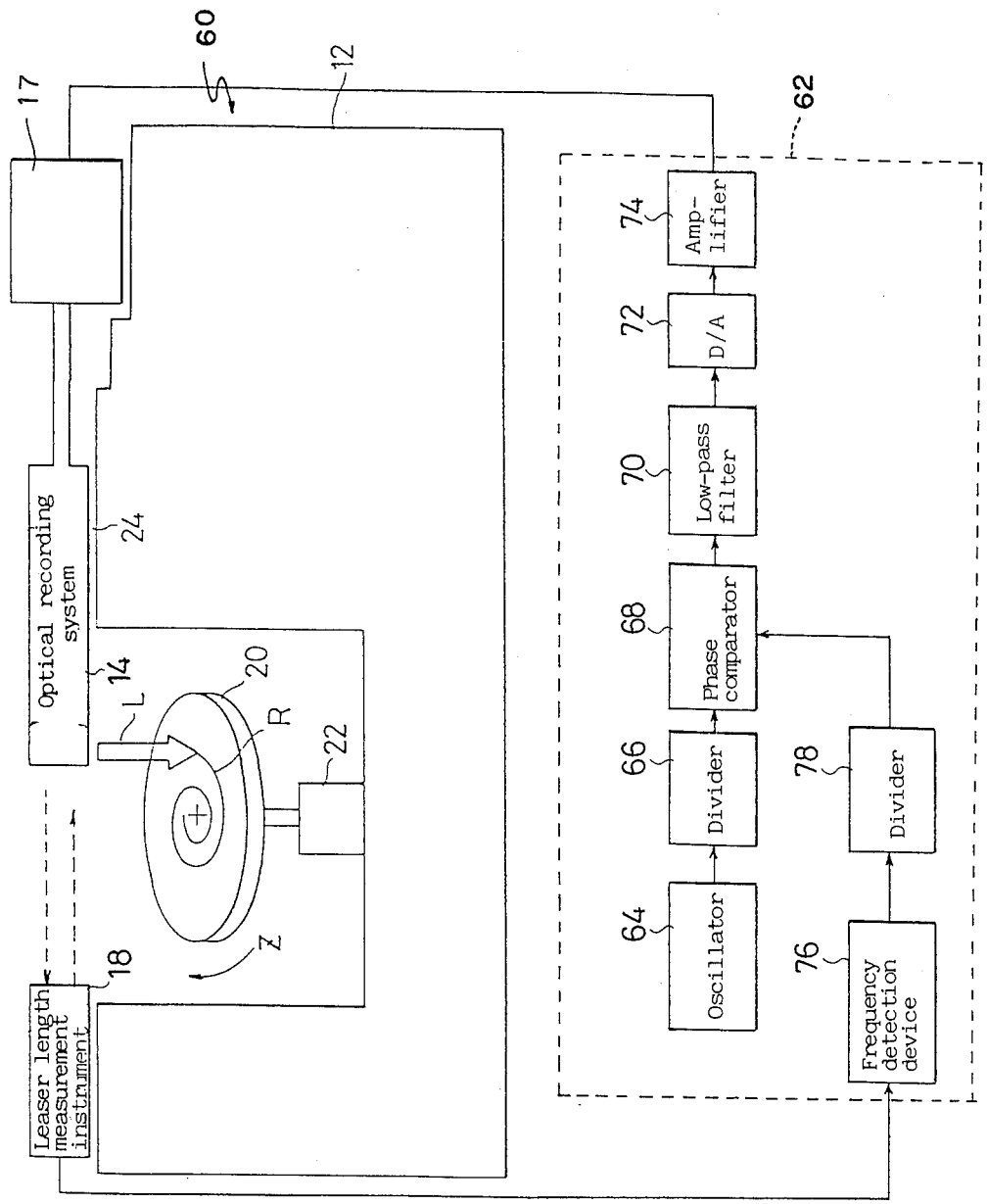
FIG. 4 is a block diagram of the control section of another embodiment of the high density spiral track-forming apparatus recording to the present invention.

Referring to FIG. 4, there is shown another embodiment of the high density spiral track-forming appartus according to the present invention with the reference number 60.

In this embodiment, elements which are the same as in FIG. 2 have been given the same reference numbers, and will not be explained further.

A control section 62 of this embodiment is adapted for controlling the feed motor 17 to maintains the moving velocity of the optical recording system 14 in the radial direction of the disk 20 equivalent to the predetermined velocity according to a pulse signal from the laser length measuring instrument 18. This control section 62, as shown in FIG. 4, comprises a oscillator 64 a divider 66, a phase comparator 68, a low pass filter 70, a digital/analogue converter 72, an amplifier 74, a frequency detector 76, and a divider 78. A pulse which is put out at a fixed period from the oscillator 64 is divided into a standard pulse having a period corresponding to the previously mentioned predetermined velocity, by means of the divider 66, and is fed into one of the input terminals of the phase comparator 68. The frequency of the pulse corresponding to the distance moved by the optical recording system 14, which distance is put out by the laser length measurement instrument 18, is detected in the frequency detector device 76, and furthermore the divider 78 divides that pulse, and feeds it to the other input terminal of the phase comparator 68. These two input pulses are compared in the phase compartor 68, and the phase difference signal is put out to the amplifier 74 through the low pass filter 70 and the D/A converter 72. The amplifier 74 amplifies and arranges the phase difference signal such that the phase difference detected by the phase comparator 68 is reduced to zero, and put out to the feed motor 17 for controlling the drive of the feed motor 17. Accordingly, in this control section 62, as shown in the timing charts of FIG. 5A to FIG. 5C, the standard pulse (FIG. 5B) with the period $\Delta t2$ corresponds to the predetermined travel speed of the optical recording system 14. And the phase difference $\Delta t3$ between the measured pulse (FIG. 5A) of the travel period $\Delta t1$ corresponding to the measured result of the travel distance of the optical recording system 14 input from the laser length measuring instrument 18, and the standard pulse $\Delta t2$ is detected. Then, the drive of the feed motor 17 is controlled to eliminate this phase difference $\Delta t3$ thereby maintaining the travel velocit of the optical recording system 14 at the set velocity. By means of the configuration of this type of control section 62, the regulation control time of the travel velocity of the optical recording system 14 corresponds to the time interval of the pulse train. For this reason, it is possible to expand the servo band to the high frequency band, and thus minimize the track pitch error attributable to the disturbance of the high frequency band.

Next, based on this configuration, the operation of the high density spiral track-forming apparatus 60 of this embodiment according to the present invention will be explained.

The disk 20 rotates with a fixed velocity. The feed velocit of the optical recording system 14 is determined by the size of the disk 20 and the pitch of the track which is to be formed. The control section 62 puts out a drive signal to the feed motor 17 to provide that feed velocity, and initiates the radial feed of the optical recording system 14. At the same time, the control section 62 puts in the measured result of the travel distance of the optical recording system 14 from the laser length measuring instrument 18, and, based on the pulse train which is this measured result, compares the travel frequency of the optical recording system 14 with the standard pulse train corresponding to the predetermined feed velocity, and calculates the phase difference. Then the control section 62, operating to make this phase difference zero and thus controlling the drive of the feed motor 17, controls the velocity by making the radial feed velocity of the optical recording system 14 equivalent to the uniform predetermined feed velocity. By using of this kind of velocity control method, the change in velocity relative to the travel distance of the optical recording system 14 is uniform, as shown by the broken line in FIG. 6. In addition, the change in travel distance of the optical recording system 14 relative to time, becomes almost a proportional straight line, as shown by the full line in FIG. 6, making it possible to create a smooth recording track.

Referring to FIGS. 7 to 13, a concrete construction is shown for the travel mechanism of the optical recording system, the feed motor, and the laser length measuring instrument.

Figure 7:
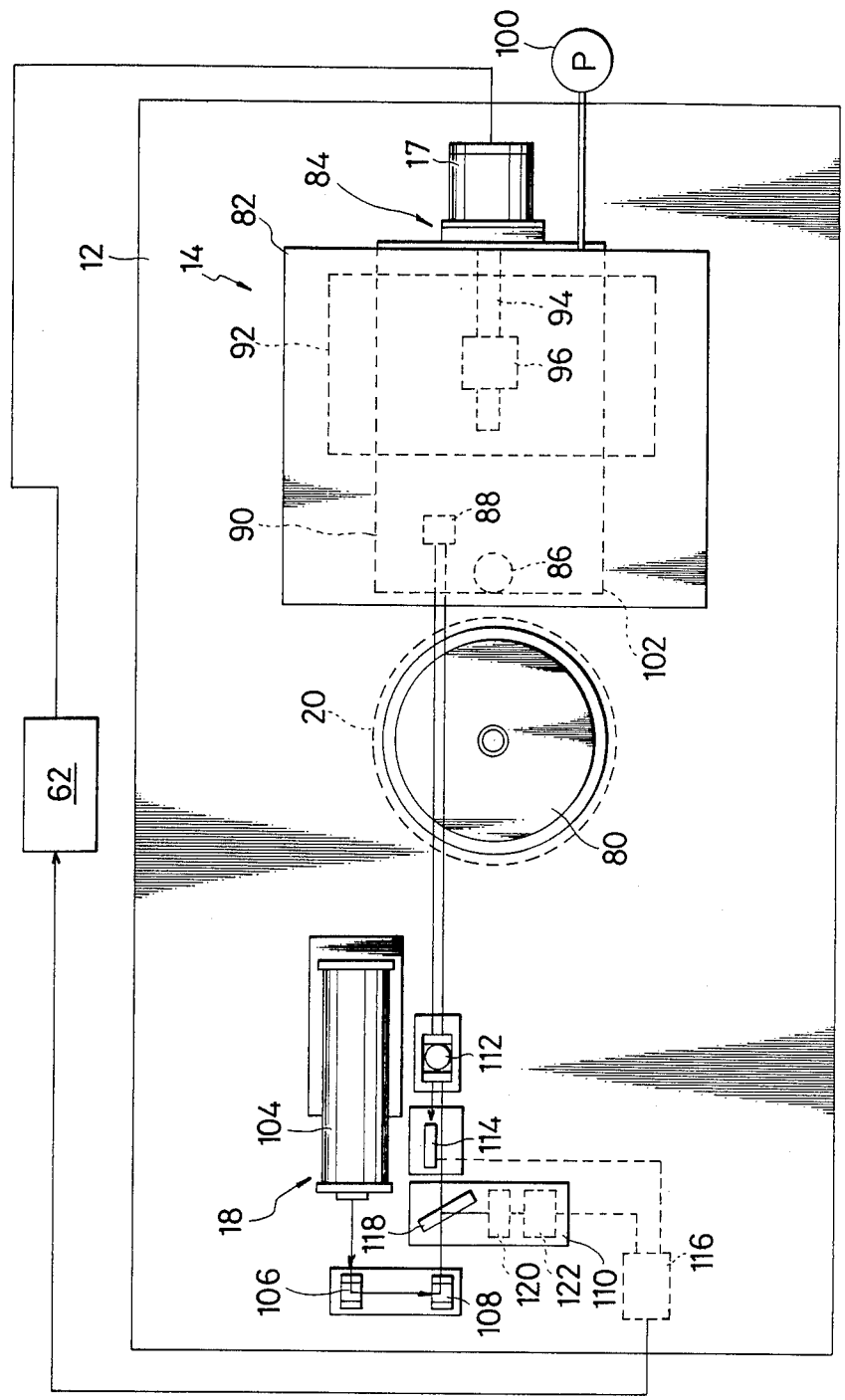
FIG. 7 is a plan view showing the concrete mechanism of the high density spiral track-forming apparatus shown in FIG. 1.
Figure 8:
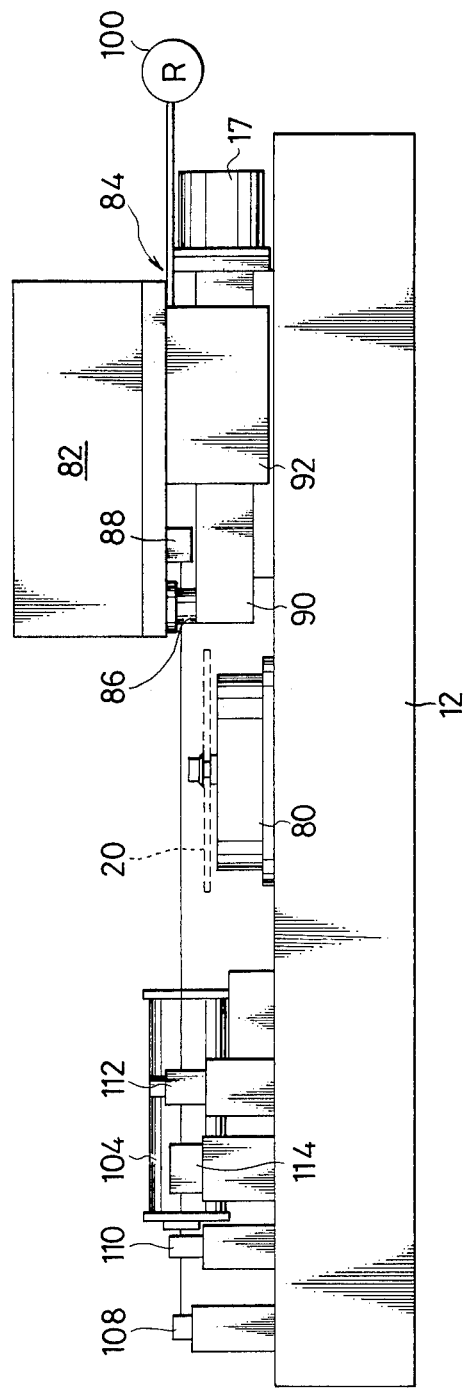
FIG. 8 is an elevational view of the high density spiral track-forming apparatus shown in FIG. 7.

As shown in FIGS. 7 and 8, the high density spiral track-forming apparatus 10 and 60 according to the present invention comprises a mounting plate 80 for mounting the disk 20 which is mounted on the antivibration plate 12 having a vibration-damping mechanism, the optical recording system 14 which moves in a straight line in the radial direction of the disk 20 for forming a latent image recording track on the glass substrate disk 20, and records an audio signal and a video signal, and the laser length measuring instrument 18 which detects the travel length of the optical recording system 14.

The mounting plate 80 has a built-in motor, and, the disk 20 is engaged with the rotary shaft of the motor to create an integral unit. Accordingly, the disk 20 which is mounted on the mounting plate 80 rotates along with, and driven by, the rotation of the motor.

The optical recording system 14 is adapted to form the latent image of a recording track on the disk 20, and includes an optical recording section 82 which records a video signal and an audio signal, and a travel control section 84 which causes the optical recording section 82 to move in a straight line in the radial direction of the disk 20. The optical recording section 82 includes internal optics which generates a recording beam for recording data on the disk 20, and in addition includes an object lens 86 which focuses the recording beam on the disk 20, and a reflecting mirror 88 which forms a part of the laser length measuring instrument 18, which will be described later. The travel control section 84 includes the feed motor 17 which is controlled by means of the above mentioned control sections 26 and 62, a rail 90 which is connected to the feed motor 17, a slider 92 which adheres to the optical recording section 82 so as to enclose one part of the rail 90, a feed screw 94 which is secured to rotor shaft of the feed motor 17, and a feed nut 96 which secures the slider 92 into which the feed screw 94 is inserted. The slider 92 is formed to contain an air channel 98 as shown in FIG. 5, and air fed from an air pump 100 causes it to float relative to the rail 90 without making contact. In other words, the rail 90 and the slider 92 together form an air bearing 102. Accordingly, when the feed motor 17 is driven, the feed screw 94 rotates, upon which the feed nut 96 moves in a straight line in the radial direction of the disk 20. At the same time, the optical recording section 82, which is fastened to the feed nut 96 through the slider 92, is able to move smoothly in a straight line in the radial direction of the disk 20 because the slider 92 floats without contact on the rail 90.

Figure 9:
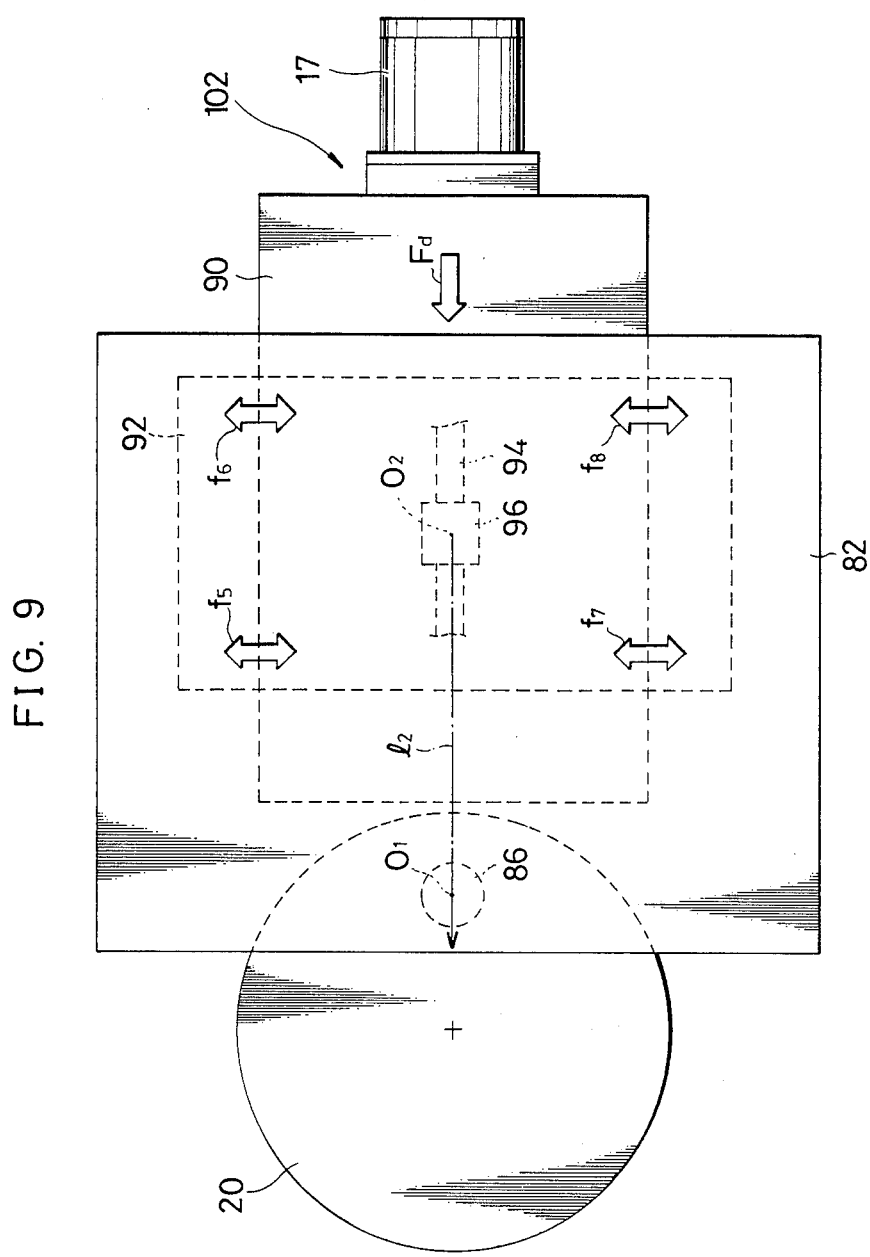
FIG. 9 is a plan view of the feed mechanism of the optical recording system of the high density spiral track-forming apparatus shown in FIG. 7.
Figure 10:
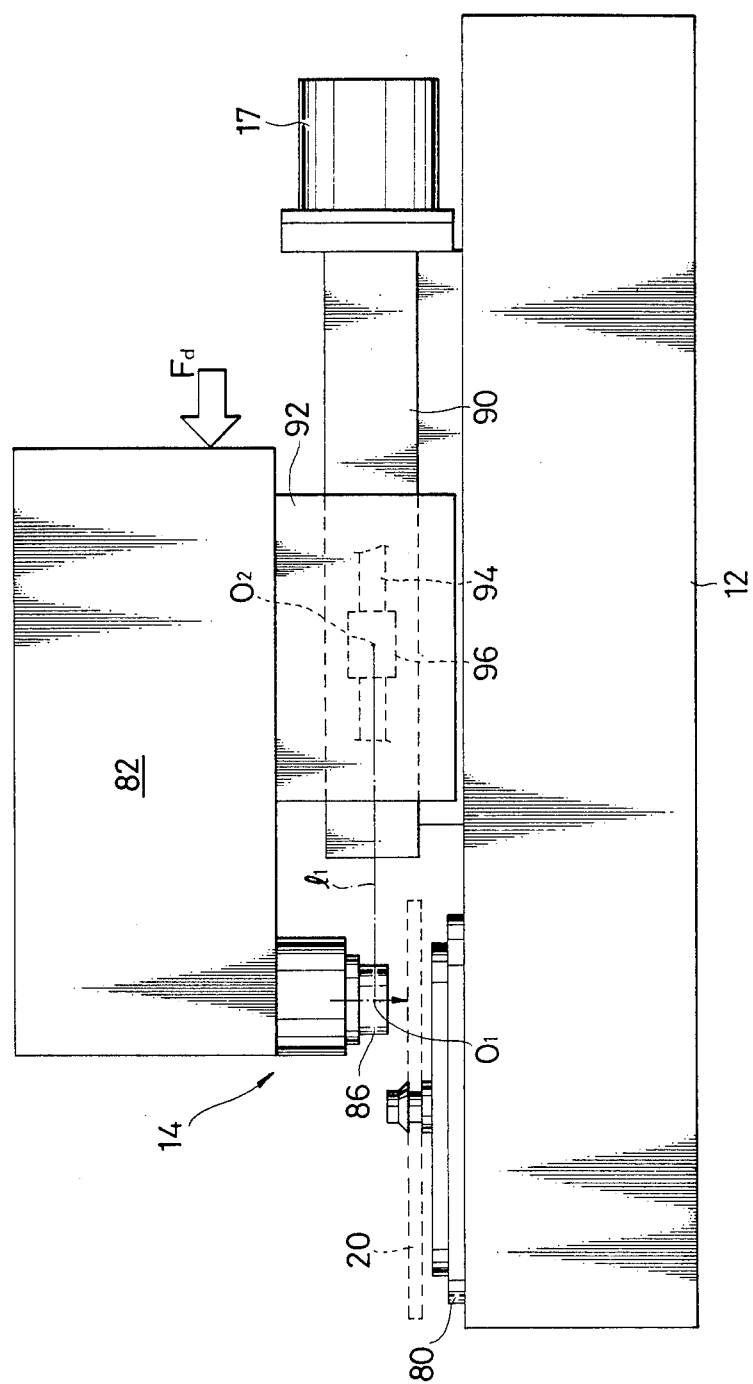
FIG. 10 is an elevational view of the feed mechanism of the optical recording system shown in FIG. 9.
Figure 11:
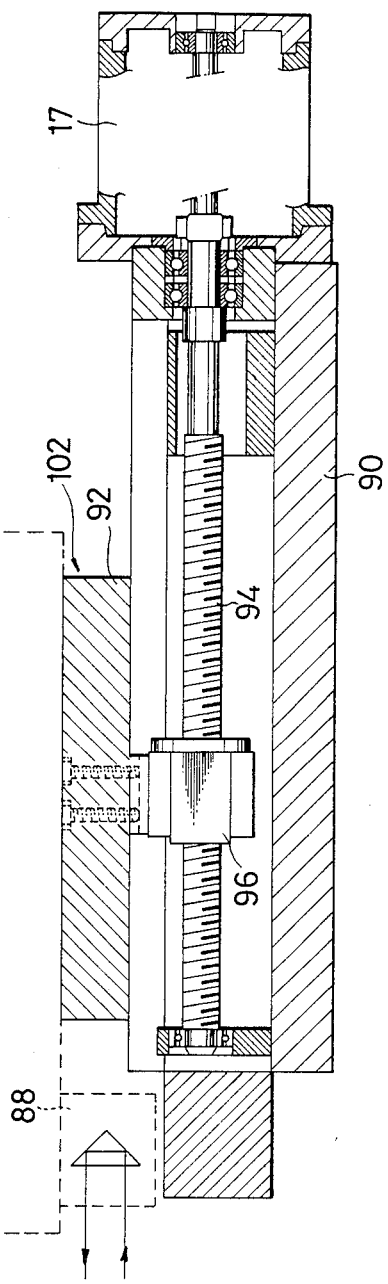
FIG. 11 is a cross sectional view of the feed mechanism of the optical recording system shown in FIG. 9.
Figure 12:
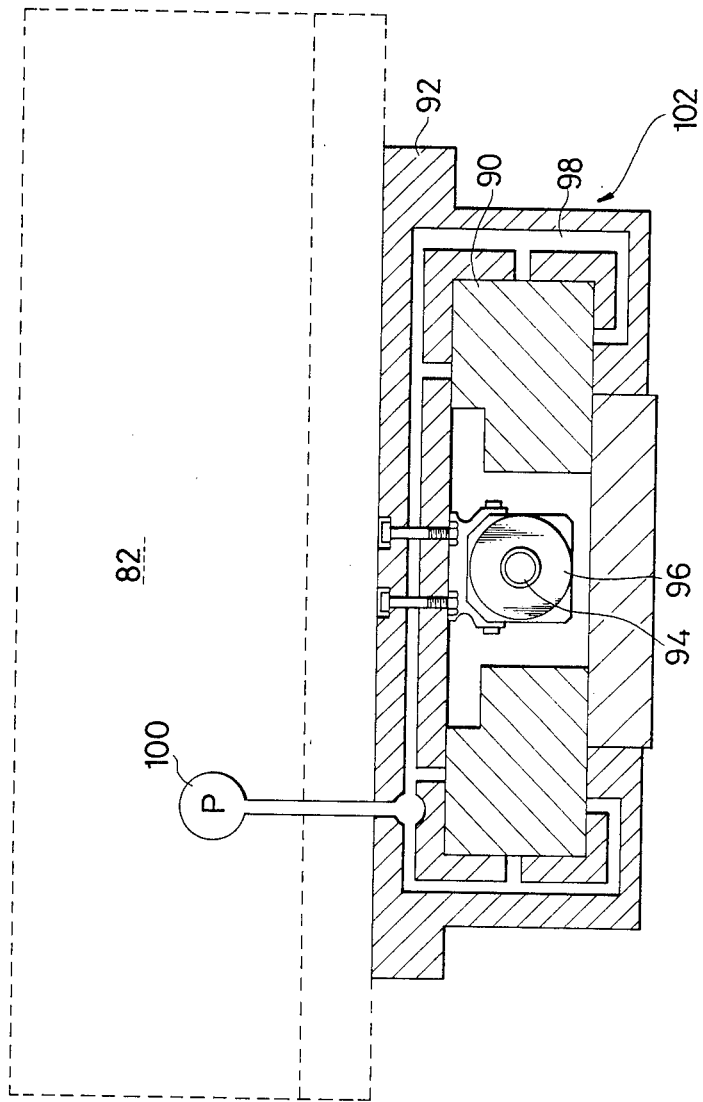
FIG. 12 is a cross sectional view, looking from the front, of the feed mechanism of the optical recording system shown in FIG. 9.

By the configuration for the optical recording system 14, as shown in FIG. 10, the line segment $l_1$ joining the respective centers $O_1$ and $O_2$ of the object lens 86 and the feed nut 96 is positioned almost perpendicular to the rotor center line of the disk 20. Accordingly, if a force disturbance Fd is applied, even if the optical recording section 82 undergoes rotary motion around the center $O_2$ of the feed nut 96, the object lens 86 is displaced in almost a vertical direction only, and the displacement component in the direction of the track pitch on the disk 20 can be kept extremely small. In addition, as shown in FIG. 9, the rotary motion of the optical recording section 82 around the center $O_2$ of the feed nut 96 is regulated as a result of the constraints of an air bearing 102, as shown by the arrows $f_5$ to $f_8$, and the component in the radial direction of the disk 20 is extremely small, so that there is the advantage of making it possible to have an extremely small track pitch error as a result of the rotary motion of the optical recording system 14.

Figure 13:
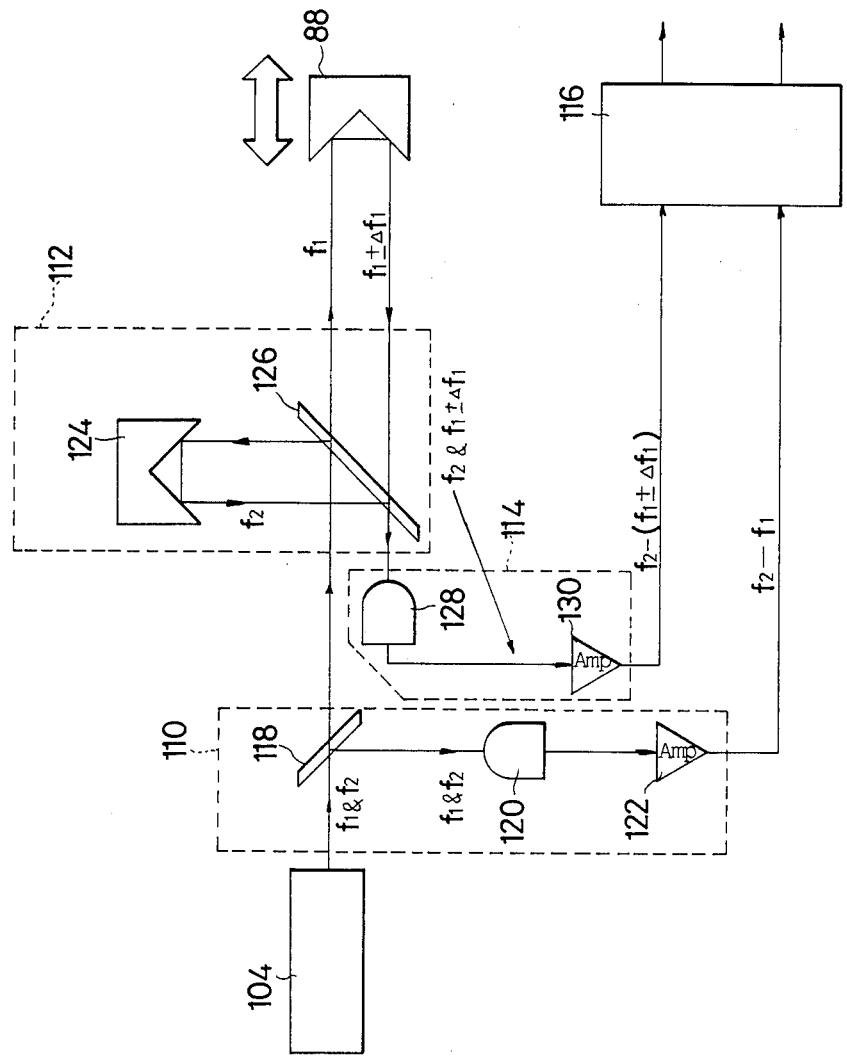
FIG. 13 is an explanatory drawing showing the measurement principles of a laser length measuring instrument of the spiral track-forming apparatus shown in FIG. 1.

As shown in FIG. 7 and FIG. 13, the laser length measuring instrument 18 measures distances using a laser beam interference phenomenon, and comprises a laser head 104, a reflecting mirror 106 and a reflecting mirror 108 for altering the beam path, a laser beam splitting section 110, an interferometer 112, a reflecting mirror 88 which is mounted on the optical recording section 82, a beam detecting section 114, and a pulse converter 116. The laser head 104 is of a type known as a double frequenc laser head, which generates a laser beam having frequencies slightly changed, mutually reverse rotation bilateral polarized light of frequencies $f_1$ and $f_2$. And in the output section of this laser beam there is a $\frac{1}{4}$ wavelength plate and a $\frac{1}{2}$ wavelength plate, and the generated laser beam is put out as linearly polarized light. The reflecting mirrors 106 and 108 are for altering the path of the laser beam which is put out from the laser head 104, directing it in the direction of the measuring reflecting mirror 88. The laser beam splitting section 110 includes a standard beam splitter 118 for splitting a laser beam which has had its beam path altered, a photodetector 120 which converts the split laser beam into an electrical signal, and an AC amplifier 122 which amlifies the photoelectric transferred signal. The interferometer 112 puts out the laser beam with the frequenc $f_1$ to the measuring reflecting mirror 88, and the laser beam with the frequency $f_2$ to a built-in, fixed standard corner cube mirror 124 among the laser beams passing through the laser beam splitting section. In addition, the interferometer 112 has a measurement beam spliter 126 which photoelectrically registers both laser beams which are then spectrally separated, and the beam splitter 126 further receives the laser beams reflected from the measuring reflecting mirror 88, and the laser beams reflected from the fixed standard corner cube mirror 124. The beam detection section 114 receives the laser beams from the interferometer 112, and includes a photodetector 128, which photoelectrically converts these laser beams, and an AC amplifier 130 which amplifes the photoelectrically converted signals.

The pulse converter 116 provides the measured result of the travel distance of the optical recording system 14, based on the signal from the AC amplifier 122 in the laser beam splitting section 110 and the signal from the AC amplifier 130 in the beam detecting section 114.

Here, the operating principles of the laser length measuring instrument 18 will be explained with reference to FIG. 13 which is an explanatory drawing showing the measurement principles of this instrument.

The laser beams with the frequencies $f_1$ and $f_2$ from the laser head 104 are split in a standard beam splitter 118. One part is directed to a photodetector 120 as a reference signal, while the other part is directed to the interferometer 112 to detect the travel velocity of the optical recording section 82. The laser beams detected in the photodetector 120 are amplified in the AC amplifier 122 after being converted photoelectrically and fed to the pulse converter 116. The laser beams with the frequencies $f_1$ and $f_2$, which pass through the laser beam splitter section 110, are optically separated into their spectral components in the measuring beam splitter 126. The laser beam with the frequency $f_1$ is transmitted to the measuring reflecting mirror 88 which is fixed in the optical recording section 82. The laser beam with the frequency $f_2$ is transmitted by reflection to the fixed standard corner cube mirror 124, and is united with the laser beam with the frequency $f_1$, which is reflected back from the measuring reflecting mirror 88, at the measuring beams splitter 126. This superpositioning produces an interfering signal. In other words, when the optical recording section 82 moves, the laser beam with the frequency $f_1$ produces a Doppler modulation of frequency $f_1$ in the direction of motion and its frequency becomes $(f_1 +/- \Delta f_1)$. The superpositioned laser beams at the measuring beam splitter 126 are put in to the beam detection section 114. And at the photodetector 128, after being converted photoelectrically, the laser beam are amplified in the AC amplifier 130 and put out to the pulse converter 116. The pulse converter 116 isolates frequency $f_1$ from signals from the amplifiers 122 and 130, and puts out one pulse for each $\frac{1}{4}$ wave length movement. Namely, within the pulse converter 116, one signal $(f_2 - f_1)$ and other signal $(f_2 - (f_1 +/- \Delta f_1))$ are compared periodically, and, every time one signal is advanced or retarded in relation to the other signal, an up-pulse or down-pulse is put out. This pulse signal is put out to the control sections 26 and 62, and is used for the drive control of the feed motor 17. Furthermore, one pulse can be less than 1/100 of a wave length.

In the two embodiments of the present invention discussed above, the first embodiment uses a linear DC motor as the motive means, while the second embodiment uses a standard motor. However, it is obvious that a standard motor could be used in the first embodiment and a linear DC motor in the second embodiment.

In summary, by means of the present invention, it is possible to carry out high density track formation by means of a velocity control system, in which both a feed motor for radial feed of an optical recording system and a laser length measuring instrument are used; and continuous feed is made possible at the target velocity, with high precision and high resolution, so that the track pitch can be narrowed with precision without causing adjacent tracks to intersect.

Various modifications will become possible for those skilled in the art after receiving the teachings of the present disclosure without departing from the scope thereof.

What is claimed is:

1. In a high density spiral track-forming apparatus which forms a spiral-shaped recording track on a disk-shaped substrate disk by focusing the recording beam on the surface of the disk-shape substrate disk while moving the optical recording system in the radial direction of the rotating disk-shape substrate disk, an optical recording system transferring device, comprising:
   (i) means for transferring the optical recording system in the radial direction of the substrate disk;
   (ii) means for detecting the travel velocity of the optical recording system, said travel velocity detecting means having,
      (a) length measuring means for measuring the distance traveled of the optical recording system in the radial direction of the substrate disk and for generating a traveled distance equal corresponding thereto, and
      (b) velocity computing means for computing the travel velocity of the optical recording system according to the optical recording system traveled distance signal from the length measuring means and the time elapsed during said distance traveled, and for generating a travel velocity signal corresponding to said computed travel velocity;
   (iii) means for setting a target velocity value for the optical recording system and for generating a target velocity signal corresponding thereto;
   (iv) means for comparing the travel velocity signal from said travel velocity detecting means with the target velocity signal from said target velocity setting means;
   (v) means for controlling said optical recording system transferring means so that the travel velocity of the optical recording system becomes equivalent to the target velocity;
   (vi) where said length measuring means comprises a laser length measuring device; and
   (vii) said velocity computing device comprises a trigger circuit for outputting sampling signals with a fixed sampling period, a gate circuit for inputting a positional signal from the optical recording system from the laser length measuring device in accordance with the sampling signal from the trigger circuit, a delaying device for delaying the positional signal from the gate circuit by a time equal to one sampling period, a first memory device for registering the delayed positional signal from the delaying device, a second memory device for registering a subsequent positional signal from the gate circuit, a comparator for comparing the positional signal from the first memory device and the subsequent positional signal from the second memory device to compute their difference, and a multiplier for outputting the result of multiplication obtained by multiplying the signal for the distance traveled sent from the comparator by the inverse of the sampling time.

* * * * *